United States Patent
Sitter

[15] 3,696,597
[45] Oct. 10, 1972

[54] RESILIENT LINKAGE FOR LIMB SHAKER

[72] Inventor: Evan L. Sitter, P.O. Box 95, McLean, Tex. 79057

[73] Assignee: Spencer B. Sitter

[22] Filed: April 16, 1971

[21] Appl. No.: 134,581

[52] U.S. Cl. .............................................56/328 TS
[51] Int. Cl. ............................................A01g 19/00
[58] Field of Search .......56/328, 329, 328 TS, 306, 1

[56] References Cited

UNITED STATES PATENTS

| | | | |
|---|---|---|---|
| 1,623,497 | 4/1927 | Rurup | 56/328 TS |
| 2,542,665 | 2/1951 | Gustofson | 56/328 TS |
| 3,101,583 | 8/1963 | Ferguson | 56/328 TS |
| 3,132,458 | 5/1964 | Russell et al. | 56/328 TS |
| 3,457,713 | 7/1969 | Plummer | 56/328 TS |

*Primary Examiner*—Russell R. Kinsey
*Attorney*—Charles W. Coffee

[57] ABSTRACT

Fruit bearing limbs are shaken with a boom at the natural frequency of the limb to shake the fruit therefrom. The boom is vibrated by a resilient linkage which includes two coaxial, helical springs in compression with excitation transmitted midway therebetween.

10 Claims, 4 Drawing Figures

EVAN L. SITTER
INVENTOR.

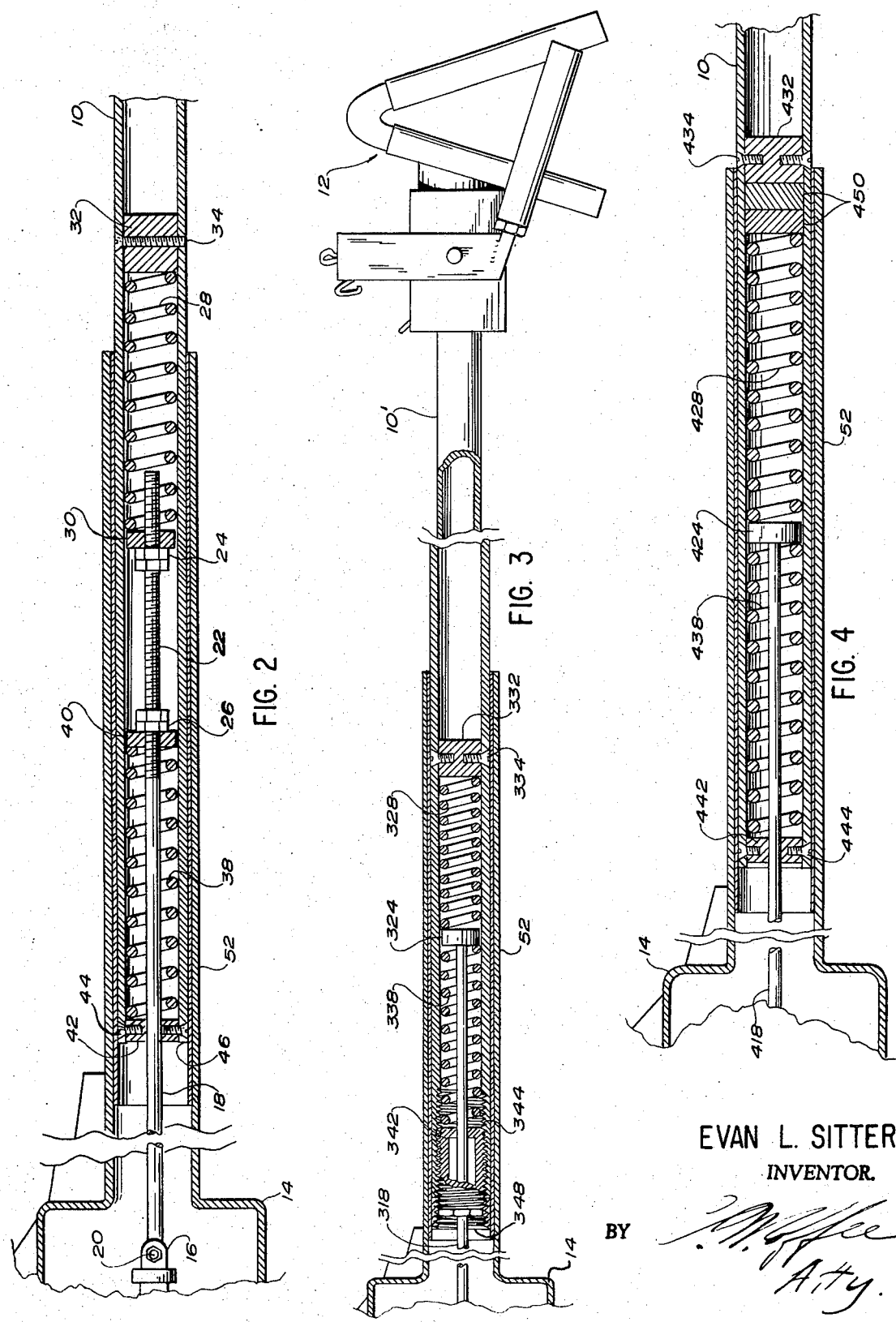

RESILIENT LINKAGE FOR LIMB SHAKER

BACKGROUND OF THE INVENTION

1. Field of the Invention

This invention relates to harvesting fruit by shaking the tree. More specifically, this invention relates to an improved shaker for shaking an individual limb of a tree.

2. Description of the Prior Art

Recently, limb shakers have been introduced upon the market, basically according to this disclosure, however, these limb shakers are using a different resilient linkage between the exciter and the limb holder. Difficulty has been experienced with the resilient connection or spring arrangement of the product which was first introduced on the market and damage has resulted to the spring due to excessive tension on the spring.

SUMMARY OF THE INVENTION

1. New and Different Function

I have improved upon the resilient linkage between the exciter and the boom in a limb shaker by using two springs, which are always maintained in compression. Therefore, I have provided springs which cannot be damaged due to tension placed upon them since there is never any tension placed upon the springs. Also, the springs are not damaged because of excess compression placed upon them because the springs do not reach the limit of deformation before they are flattened with one helical coil against the next.

In addition to this, it is possible to adjust the resilience of the spring. In the design presently on the market the resilience of the spring could be adjusted only by removing one spring and replacing it with another. However, in my design, the resilience of the spring can be adjusted by putting more or less initial compression upon the spring.

2. Objects of the Invention

An object of this invention is to shake fruit from the limbs of a tree for harvesting.

Another object of this invention is to provide an improved resilient linkage between the exciter and the boom of a limb shaker for fruit harvesting.

Further objects are to achieve the above with a device that is sturdy, compact, durable, lightweight, simple, safe, efficient, versatile, and reliable, yet inexpensive and easy to manufacture, install, operate and maintain.

Still further objects are to achieve the above with a method that is versatile, rapid, efficient, and inexpensive, and does not require skilled people to install, adjust, operate, and maintain.

The specific nature of the invention, as well as other objects, uses, and advantages thereof, will clearly appear from the following description and from the accompanying drawing, the different views of which are not to the same scale.

BRIEF DESCRIPTION OF THE DRAWING

FIG. 2 shows an enlarged axial sectional view of a portion of the device shown in FIG. 1, illustrating an embodiment of this invention.

FIG. 3 is a partial axial, sectional view similar to FIG. 2 showing a modified form of the invention.

FIG. 4 is a partial axial, sectional view similar to FIG. 3 showing another modified form of the invention.

DESCRIPTION OF THE PREFERRED EMBODIMENTS

Figure 1:
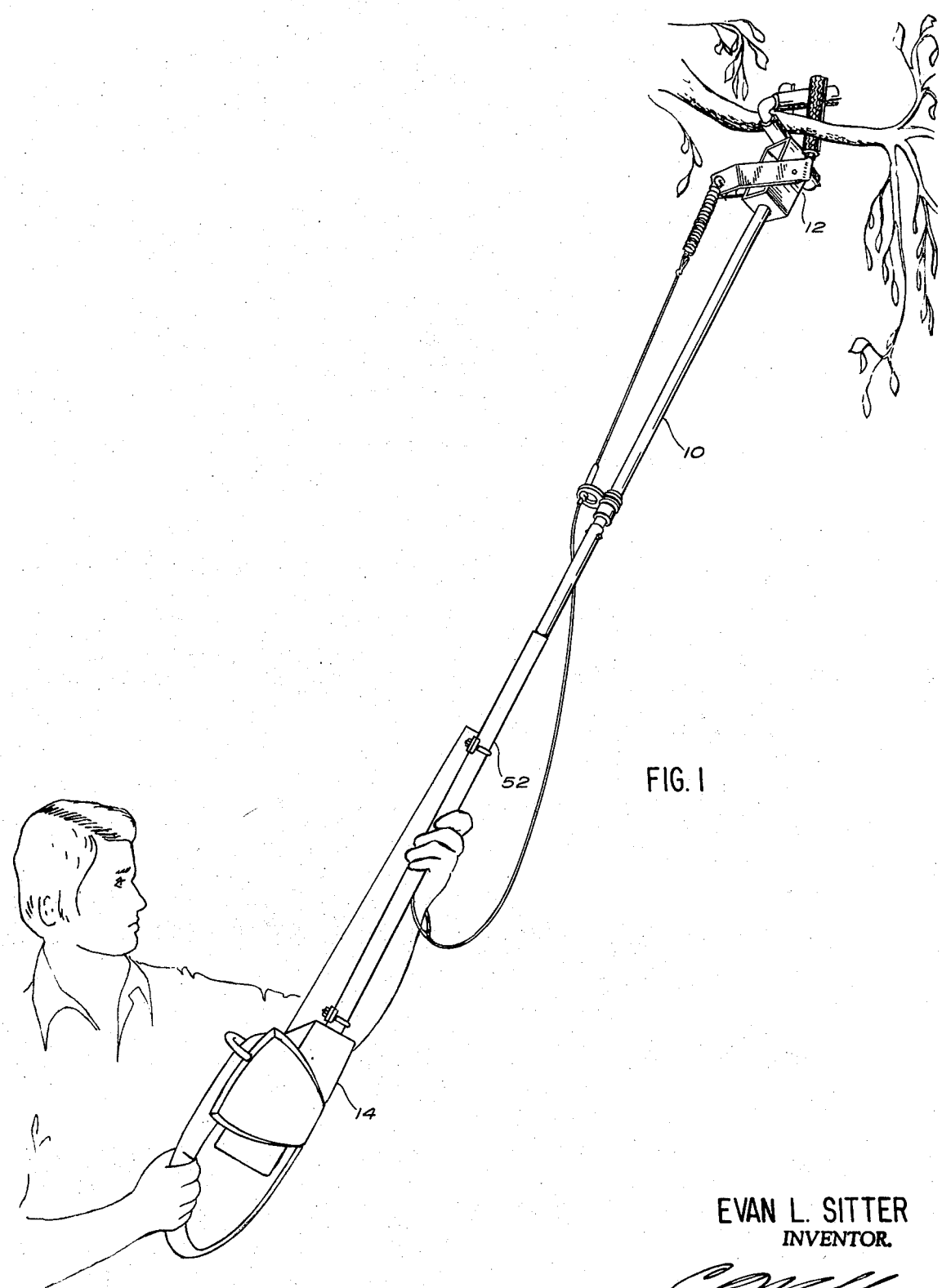
FIG. 1 illustrates a complete limb shaker, with an operator, being used to shake a limb of a tree having fruit thereon.

Referring to the drawing and more particularly to FIG. 1, it may be seen there illustrated a fruit harvester having an elongated boom 10. Limb holder 12 on the end of the boom is more particularly described in my son's patent application identified above. The limb holder 12 forms a means on the distal end of the elongated boom 10 for engaging a limb of the tree.

Power means 14 in the form of an internal combustion motor is used to cause the boom 10 and the limb to vibrate at the natural frequency of the limb. The boom is vibrated by axial excitation which is aligned with the longitudinal axis of the boom.

Referring now more particularly to FIG. 2, it may be seen that the power means causes exciter 16 to reciprocate at a frequency directly related to the speed of the power means 14. The rectilinear reciprocation of the exciter 16 will be aligned with the longitudinal axis of the boom 10. Pitman 18 is attached by suitable means such as bolt 20 to the exciter. The pitman 18 is aligned with the longitudinal axis of the boom 10. The pitman extends to within the boom 10 and terminates with a threaded portion 22. Two nuts 24 and 26 each with jam nuts are threaded onto the threaded portion 22.

Resilient element in the form of helical spring 28 extends from washer 30 abutting nut 24 to plug 32 which is held within the boom by plug bolt 34. Another resilient element in the form of helical spring 38 abuts against washer 40 abutting against nut 26 and extending to internal flange 42 secured into place by fasteners 44 at the end 46 of the boom. The nuts 24 and 26 are positioned upon the pitman 18 so the resilient elements in the form of helical spring 28 and 38 are always under compression.

Explaining the operation the exciter 16 through the pitman 18 excites the boom 10 so the boom and the limb vibrate at the natural frequency of the limb. It will be also understood that the boom and the limb will have a greater amplitude or greater movement than the exciter 16 and the pitman 18. Therefore, the compression upon the resilient elements in the form of helical springs 28 and 38 is such that the movement of the end of the pitman 18 with the protuberances in the form of nuts 26 and 24 relative to the boom are such that they are always in contact with the helical springs.

For different operations, depending upon the kind and variety and condition of the limb being shaken, it may be desirable to have greater or lesser degree of resilience upon the compression springs 28 and 38; therefore, if it is desirable that these springs should have less give to them, it is an easy matter to remove the boom 10 by first removing the bolt 20. The next step is to remove the fasteners 44 in the internal flange 42 and remove the pitman 18 from within the boom 10 and adjust the nuts 24 and 26 with their jam nuts so a greater or lesser amount of tension is placed upon the compression springs 28 and 38.

In the embodiment of FIG. 3, boom 10' is vibrated from excitor (not shown), which is mounted upon power means 14. However, in this case, the pitman 318 has a single protuberance in the form of flange 324 upon the end thereof. Helical spring 328 extends from the protuberance 324 to plug 332 held in place by plug bolt 334. Also, spring 338 is held in place between the protuberance 324 and internal flange 342. In this instance the internal flange 342 is threaded to threads 344 in the end of the boom 10'. Jam nut 348 is threaded to the free end of the internal flange 342 to hold the internal flange in adjusted position.

Therefore, the operation of the device as seen in FIG. 3 may be seen to be the same as the operation of the device in the embodiment shown in FIG. 2; however, the only difference being that the adjustment of the compression upon the springs 328 and 338 is accomplished by positioning the internal flange 342. Of course, the change of the compression on the resilient elements in the form of helical springs 328 and 338 results in a different orientation or location of the boom 10' with respect to the power means 14. However, the exact length of the boom or its orientation within two or three inches of the power means is not critical and therefore, is of no consequence.

FIG. 4 illustrates yet another embodiment by which the boom 10 is vibrated from the rectilinear vibration of the excitor (not shown). In this particular embodiment, the pitman 418 extends from the excitor to the distal protuberance 424 which is placed between resilient elements in the form of helical springs upon the resilient elements in the form of compression springs 428 and 438 is obtained by placing slugs or spacers 450 into the boom. In detail, the internal flange 442 is removed and the pitman 418 and springs 428 and 438 are removed and one or more spacers 450 is dropped into the boom so when the mechanism is re-assembled, the spacer 450 is between the plug 432 and the end of the helical spring 428 as illustrated in FIG. 4.

Therefore, it may be seen that I have provided a means for making the resilient connection between the excitor 16 which is actuated from the power means 14 and the boom 10 or 10'. It will be understood that in each instance, I used a pitman 18 or 318 or 418; however, it will also be apparent to mechanics ordinarily skilled in these arts that by a different rearrangement of parts and a different mounting of the boom within its tube 52, the excitor itself could be placed between two resilient elements (of some other form than compression springs). In this instance, the pitman would be eliminated.

The embodiments shown and described above are only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:

1. In a fruit harvester having,
   a. an elongated boom,
   b. means on the elongated boom for engaging a limb of a tree,
   c. an excitor, and
   d. power means connected to the excitor for vibrating the excitor in a direction aligned with the longitudinal axis of the boom;
   e. the improvement in a resilient member to interconnect the excitor and boom comprising:
   f. two resilient elements
      i. axially aligned with the longitudinal axis of the boom, and
      ii. having adjacent ends, and
      iii. remote ends,
   g. stops on the boom,
   h. said remote ends of the resilient elements abutted against the stops in a compressed state, and
   j. the excitor connected between the adjacent ends of the resilient elements.

2. The invention as defined in claim 1 with the additional limitation of
   k. said resilient elements being compression springs.

3. The invention as defined in claim 1 wherein said excitor is connected between the adjacent ends of the resilient elements by
   k. a pitman with
      i. a power end connected to said excitor, and
      ii. a distal end connected between the two resilient elements.

4. The invention as defined in claim 3 with the additional limitation of
   m. said resilient elements being compression springs.

5. The invention as defined in claim 1 with the additional limitation of
   k. means for changing the amount of compression of the resilient elements.

6. The invention as defined in claim 5 wherein said excitor is connected between the adjacent ends of the resilient elements by
   m. a pitman with
      i. a power end connected to said excitor, and
      ii. a distal end connected between the two resilient elements.

7. The invention as defined in claim 5 with the additional limitation of
   m. said resilient elements being compression springs.

8. The invention as defined in claim 7 wherein said excitor is connected between the adjacent ends of the resilient elements by
   n. a pitman with
      i. a power end connected to said excitor, and
      ii. a distal end connected between the two resilient elements.

9. In a process of harvesting fruit by shaking tree limbs with an elongated boom including
   a. engaging the distal end of the boom with the tree limb having fruit to be harvested, and
   b. vibrating the tree limb at its natural frequency by
   c. axially vibrating the boom
   d. by resiliently transmitted excitation;
   e. the improved method of resiliently exciting the boom comprising the steps of:
   f. longitudinally aligning two resilient elements having adjacent ends with the boom,
   g. attaching the remote ends of the resilient elements to the boom,
   h. compressing the two resilient elements, and j. periodically displacing the resilient elements at their adjacent ends.

10. The invention as defined in claim 9 with the additional limitation of k. changing the compression on the resilient elements for different conditions.

* * * * *